(12) United States Patent
Ono et al.

(10) Patent No.: US 9,996,062 B2
(45) Date of Patent: Jun. 12, 2018

(54) MOTOR CONTROL APPARATUS, MOTOR CONTROL METHOD, PROGRAM, AND RECORDING MEDIUM

(71) Applicant: OMRON Corporation, Kyoto (JP)

(72) Inventors: Yasushi Ono, Kusatsu (JP); Mamoru Egi, Otsu (JP); Yasutomo Kawanishi, Kusatsu (JP); Yasumoto Mori, Joyo (JP)

(73) Assignee: OMRON Corporation, Kyoto (JP)

(*) Notice: Subject to any disclaimer, the term of this patent is extended or adjusted under 35 U.S.C. 154(b) by 0 days. days.

(21) Appl. No.: 15/381,024

(22) Filed: Dec. 15, 2016

(65) Prior Publication Data
US 2017/0261948 A1    Sep. 14, 2017

(30) Foreign Application Priority Data

Mar. 11, 2016 (JP) .................... 2016-048956

(51) Int. Cl.
*G05B 19/18* (2006.01)
*G05B 13/04* (2006.01)
*G05D 17/02* (2006.01)

(52) U.S. Cl.
CPC .......... *G05B 13/041* (2013.01); *G05B 13/04* (2013.01); *G05D 17/02* (2013.01); *G05B 2219/41112* (2013.01); *G05B 2219/41426* (2013.01)

(58) Field of Classification Search
CPC ... A61B 34/30; A61B 90/361; A61B 19/2203; A61B 19/5212; A61B 19/22; A61B 2034/305; A61B 34/37; A61B 34/70; G11B 5/5547; G11B 5/59622; G11B 19/24; G11B 19/28; G11B 2005/0016; G11B 5/59683; G05B 13/041
(Continued)

(56) References Cited

U.S. PATENT DOCUMENTS 4,713,596 A * 12/1987 Bose .................. H02P 21/22
                                                    318/561
5,223,778 A     6/1993 Svarovsky et al.
(Continued)

FOREIGN PATENT DOCUMENTS

EP     2096507      9/2009
JP     3214270      10/2001
(Continued)

OTHER PUBLICATIONS

"Search Report of Europe Counterpart Application", dated Jul. 28, 2017, p. 1-p. 8, in which the listed references were cited.

*Primary Examiner* — David S Luo
(74) *Attorney, Agent, or Firm* — JCIPRNET (57) ABSTRACT

The present invention implements a model-tracking motor control apparatus for stabilizing behavior of a controlled object. The control apparatus (1) includes: a motor control part (20), generating a driving torque instruction value used to enable the servo motor (2) to perform driving based on a detection value of an encoder (4) that performs detection on a rotational state of a servo motor (2); and a model control part (10), generating a model torque instruction value, and outputting the model torque instruction value to the motor control part (20), where the model control part (10) has a model torque limiter (104) that limits the model torque instruction value within a first limit range.

10 Claims, 4 Drawing Sheets

(58) Field of Classification Search
USPC .......................................................... 318/569
See application file for complete search history.

(56) References Cited

U.S. PATENT DOCUMENTS

| | | | | |
|---|---|---|---|---|
| 5,495,158 A * | 2/1996 | Schmidt | ................... | H02P 23/16 318/561 |
| 5,699,207 A * | 12/1997 | Supino | ................ | G11B 5/5547 318/568.18 |
| 5,781,365 A * | 7/1998 | Romano | ............... | G11B 5/5547 318/568.18 |
| 5,825,582 A * | 10/1998 | Supino | ................ | G11B 5/5547 318/568.18 |
| 5,847,895 A * | 12/1998 | Romano | ............... | G11B 5/5547 318/568.18 |
| 5,982,721 A * | 11/1999 | Supino | ............... | G05B 13/0255 369/44.28 |
| 6,236,895 B1 * | 5/2001 | Romano | ............ | G05B 13/0255 318/568.18 |
| 6,622,080 B2 * | 9/2003 | Yang | ..................... | F02D 11/105 123/399 |
| 6,798,611 B1 * | 9/2004 | Romano | ............... | G11B 5/5582 318/568.18 |
| 6,831,809 B2 * | 12/2004 | Kagami | ............. | G11B 5/59622 318/561 |
| 7,161,761 B2 * | 1/2007 | Atsumi | ................ | G11B 5/5547 360/78.09 |
| 7,437,201 B2 * | 10/2008 | Cullen | ................... | G05B 17/02 700/29 |
| 7,453,227 B2 * | 11/2008 | Prisco | .................... | A61B 19/22 318/568.11 |
| 7,606,624 B2 * | 10/2009 | Cullen | ................... | G05B 17/02 700/29 |
| 7,899,578 B2 * | 3/2011 | Prisco | .................... | A61B 19/22 700/254 |
| 8,723,472 B2 * | 5/2014 | Takeuchi | ............ | G05B 19/404 318/135 |
| 9,171,567 B1 * | 10/2015 | Nicholls | ................ | G11B 19/28 |
| 2002/0159187 A1 * | 10/2002 | Kagami | ........... | G11B 20/10527 360/75 |
| 2003/0023365 A1 * | 1/2003 | Yang | ..................... | F02D 11/105 701/103 |
| 2004/0135534 A1 * | 7/2004 | Cullen | ................... | G05B 17/02 318/609 |
| 2004/0164690 A1 | 8/2004 | Degner et al. | | |
| 2004/0239282 A1 * | 12/2004 | Yoneda | ................ | G05B 13/047 318/623 |
| 2005/0207057 A1 * | 9/2005 | Atsumi | ................ | G11B 5/5547 360/78.09 |
| 2006/0186845 A1 * | 8/2006 | Terada | ................... | G05B 19/19 318/432 |
| 2009/0021205 A1 * | 1/2009 | Cullen | ................... | G05B 17/02 318/561 |
| 2009/0099692 A1 * | 4/2009 | Prisco | .................... | A61B 19/22 700/254 |
| 2011/0160904 A1 * | 6/2011 | Prisco | .................... | A61B 19/22 700/254 |
| 2011/0285340 A1 * | 11/2011 | Takeuchi | ............ | G05B 19/404 318/632 |
| 2013/0173026 A1 * | 7/2013 | Kawana | ................ | G05B 19/416 700/30 |
| 2015/0008861 A1 | 1/2015 | Sonoda | | |
| 2015/0015173 A1 | 1/2015 | Ide et al. | | |
| 2015/0155793 A1 * | 6/2015 | Chen | ....................... | H02M 1/12 363/37 |
| 2015/0288310 A1 * | 10/2015 | Pace | ........................ | H02P 6/08 318/400.02 |
| 2015/0295522 A1 | 10/2015 | Sakai et al. | | |
| 2016/0004248 A1 * | 1/2016 | Oda | ........................ | G05B 19/19 700/170 |
| 2016/0012845 A1 * | 1/2016 | Nicholls | ................ | G11B 19/28 360/73.03 |

FOREIGN PATENT DOCUMENTS

| | | | |
|---|---|---|---|
| JP | 2010-033172 | | 2/2010 |
| JP | 2013-045163 | * | 3/2013 |
| JP | 2016-005296 | | 1/2016 |

* cited by examiner

MOTOR CONTROL APPARATUS, MOTOR CONTROL METHOD, PROGRAM, AND RECORDING MEDIUM

CROSS-REFERENCE TO RELATED APPLICATION

This application claims the priority benefit of Japan application serial no. 2016-048956, filed on Mar. 11, 2016. The entirety of the above-mentioned patent application is hereby incorporated by reference herein and made a part of this specification.

BACKGROUND OF THE INVENTION

1. Field of the Invention

The present invention relates to a model-tracking motor control apparatus for controlling driving of a motor.

2. Description of Related Art

Conventionally, an existing motor control apparatus includes a motor control system and further includes a model control system using a model, so as to perform model-tracking control (Patent Document 1 to Patent Document 3). For example, in Patent Document 1, a torque signal (referred to as a model torque signal below) that is generated based on signals output by an electric motor model and a load machine model includes a torque signal (referred to as an external interference torque signal) that takes an external interference torque into consideration and is output by a speed control circuit, and a torque instruction value used to drive the motor is then output.

Moreover, it is recorded in Patent Document 2 that in a motor driving apparatus that outputs a control instruction value based on a standard model value and a control target value, torque limiting processing of limiting the control instruction value, that is, a torque instruction value is performed.

PRIOR-ART DOCUMENTS

Patent Documents

Patent Document 1: Japanese Patent No. 3214270 (issued on Oct. 2, 2001)
Patent Document 2: Japanese Patent Laid-Open No. 2016-5296 (published on Jan. 12, 2016)
Patent Document 3: Japanese Patent Laid-Open No. 2010-33172 (published on Feb. 12, 2010)

SUMMARY OF THE INVENTION

However, in the technology in Patent Document 1, the model control system generates a model torque signal without considering an external interference torque. Therefore, in the motor control system, the model torque signal includes an external interference torque signal. Therefore, in a case in which the model torque signal output from the model control system is not limited and an external interference torque is large, in the motor control system, a torque instruction value that greatly exceeds an allowable range of output to a motor may be generated. Therefore, model tracking performance of a motor control apparatus is reduced. As a result, the following problem exists: An output signal from the motor control system becomes unstable, or even, the behavior of a controlled object becomes unstable.

Moreover, in the technology of Patent Document 2, although the motor control system has torque limiting processing, a torque component, that is, a model torque value of a standard model value output from the model control system is not limited. Therefore, the model torque value from the model control system may greatly deviate from a limit range of a torque instruction value in the torque limiting processing. In this case, model tracking performance in the motor control apparatus is reduced. As a result, the following problem exists: An output signal from the motor control system becomes unstable, or even, the behavior of a controlled object becomes unstable.

The present invention is completed in view of the problem, and is directed to provide a model-tracking motor control apparatus for stabilizing behavior of a controlled object, a motor control method and a program.

To resolve the problem, in an aspect of the present invention, a motor control apparatus performs control on a motor included in a controlled object, where the motor control apparatus includes: a motor control part, generating, based on a detection value of a rotation detector that performs detection on a rotational state of the motor, a driving torque instruction value used to enable the motor to perform driving; and a model control part, generating a model instruction value, and outputting the model instruction value to the motor control part, where the model control part includes a first torque limiting part, where the first torque limiting part limits a model torque instruction value included in the model instruction value within a first limit range.

Moreover, to resolve the problem, in a motor control method in an aspect of the present invention, control is performed on a motor included in a controlled object, where the motor control method includes: a model procedure: generating a model instruction value; and a motor procedure: generating, based on the model instruction value and a detection value of a rotation detector that performs detection on a rotational state of the motor, a driving torque instruction value used to enable the motor to perform driving, where in the model procedure, a model torque instruction value included in the model instruction value is limited within a first limit range.

According to the structure, the model control part has the first torque limiting part. Therefore, the model torque instruction value can be limited, so as to stabilize the driving torque instruction value output by the motor control part. As a result, the behavior of a controlled object can be stabilized.

Moreover, in the motor control apparatus in the aspect of the present invention, preferably, the model control part includes a setting part, where the setting part sets an upper limit value and a lower limit value of the first limit range, where the setting part sets the upper limit value and the lower limit value of the first limit range by using a manner in which an absolute value is a value greater than 0.

If the model torque instruction value output from the model control part is limited to be 0, the following problem may occur, that is, although an instruction is input in the motor control apparatus, the motor is not driven.

However, according to the structure, the setting part sets an upper limit value and a lower limit value of the first limit range by using a manner in which an absolute value is a value greater than 0. Therefore, the model torque instruction value output from the model control part is not limited to be 0. Therefore, although an instruction is input in the motor control apparatus, the problem that the motor is not driven is resolved.

Moreover, in the motor control apparatus in the aspect of the present invention, optionally, the motor control part includes a second torque limiting part, where the second torque limiting part limits the driving torque instruction value within a second limit range, and the model control part includes a setting part, where the setting part sets an upper limit value of the second limit range to be the upper limit value of the first limit range, and sets a lower limit value of the second limit range to be the lower limit value of the first limit range.

According to the structure, the model torque instruction value output from the model control part is within the second limit range of the second torque limiting part in the motor control part, so that model tracking performance of control performed by the motor control part can be further improved.

Moreover, in the motor control apparatus in the aspect of the present invention, optionally, the motor control part includes a compensation part, where the compensation part adds a torque correction value to the driving torque instruction value, and the torque correction value is at least one of a first compensation element that changes according to a driving state of the motor and a second compensation element that changes according to a driving characteristic of the controlled object, and the model control part includes a setting part, where the setting part subtracts the torque correction value from a maximum torque value and a minimum torque value of the motor, so as to set the upper limit value and the lower limit value of the first limit range.

Alternatively, in the motor control apparatus in the aspect of the present invention, optionally, the motor control part includes: a compensation part, adding a torque correction value to the driving torque instruction value, where the torque correction value is at least one of a first compensation element that changes according to a driving state of the motor and a second compensation element that changes according to a driving characteristic of the controlled object; and a second torque limiting part, limiting the driving torque instruction value within a second limit range, and the model control part includes a setting part, where the setting part sets a value that is obtained by subtracting the torque correction value from an upper limit value of the second limit range to be the upper limit value of the first limit range, and sets a value that is obtained by subtracting the torque correction value from a lower limit value of the second limit range to be the lower limit value of the first limit range.

According to the structure, the setting part of the model control part can consider the torque correction value added by the motor control part to the driving torque instruction value, so as to set the upper limit value and the lower limit value of the first limit range. Therefore, it is easy to make the driving torque instruction value added with the torque correction value by using the compensation part of the motor control part be within the second limit range. In other words, a limit that conforms to an actual driving torque value that is used during acceleration and deceleration of the motor can be imposed on the model torque instruction value. Therefore, model tracking performance in the motor control apparatus can be improved. As a result, the behavior of a controlled object can be further stabilized.

Moreover, in the motor control apparatus in the aspect of the present invention, optionally, the setting part sets, in a case in which a subtraction value that is obtained by subtracting the torque correction value from the upper limit value of the second limit range is above a first specified value greater than 0, the subtraction value to be the upper limit value of the first limit range, sets, in a case in which the subtraction value is less than the first specified value, the first specified value to be the upper limit value of the first limit range, sets, in a case in which a subtraction value that is obtained by subtracting the torque correction value from the lower limit value of the second limit range is below a second specified value less than 0, the subtraction value to be the lower limit value of the first limit range, and sets, in a case in which the subtraction value is greater than the second specified value, the second specified value to be the lower limit value of the first limit range.

According to the structure, the setting part of the model control part can consider the torque correction value added by the motor control part to the driving torque instruction value, so as to set the upper limit value and the lower limit value of the first limit range.

Therefore, it is easy to make the driving torque instruction value added with the torque correction value by using the compensation part of the motor control part be within the second limit range. Therefore, the reduction of the model tracking performance in the motor control apparatus can be further inhibited. As a result, the behavior of a controlled object can be further stabilized.

Moreover, if the model torque instruction value output from the model control part is limited to be 0, the following problem may occur, that is, although an instruction is input in the motor control apparatus, the motor is not driven.

However, according to the structure, the setting part sets the upper limit value and the lower limit value of the second limit range by using a manner in which an absolute value is a value greater than 0. Therefore, although an instruction is input in the motor control apparatus, the problem that the motor is not driven is resolved.

Moreover, in the motor control apparatus in the aspect of the present invention, optionally, the setting part sets the first specified value and the second specified value according to an input of a user.

According to the structure, the user can set a minimum range of the first limit range to be a needed range.

In addition, the motor control apparatus may also be implemented by using a computer. In this case, a program that uses a computer as the parts to perform operation to use the computer to implement the motor control apparatus and a recording medium that records the program and is readable by the computer fall within the scope of the present invention.

According to an aspect of the present invention, the following effect is achieved, that is, a model-tracking motor control apparatus for stabilizing behavior of a controlled object can be provided.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Implementation manners of the present invention are described below in detail. To make a control apparatus (a motor control apparatus) in an aspect of the present invention more comprehensible, a conventional control apparatus 9 is first described based on FIG. 4.

(An Overview of a Conventional Control Apparatus)

Figure 4:
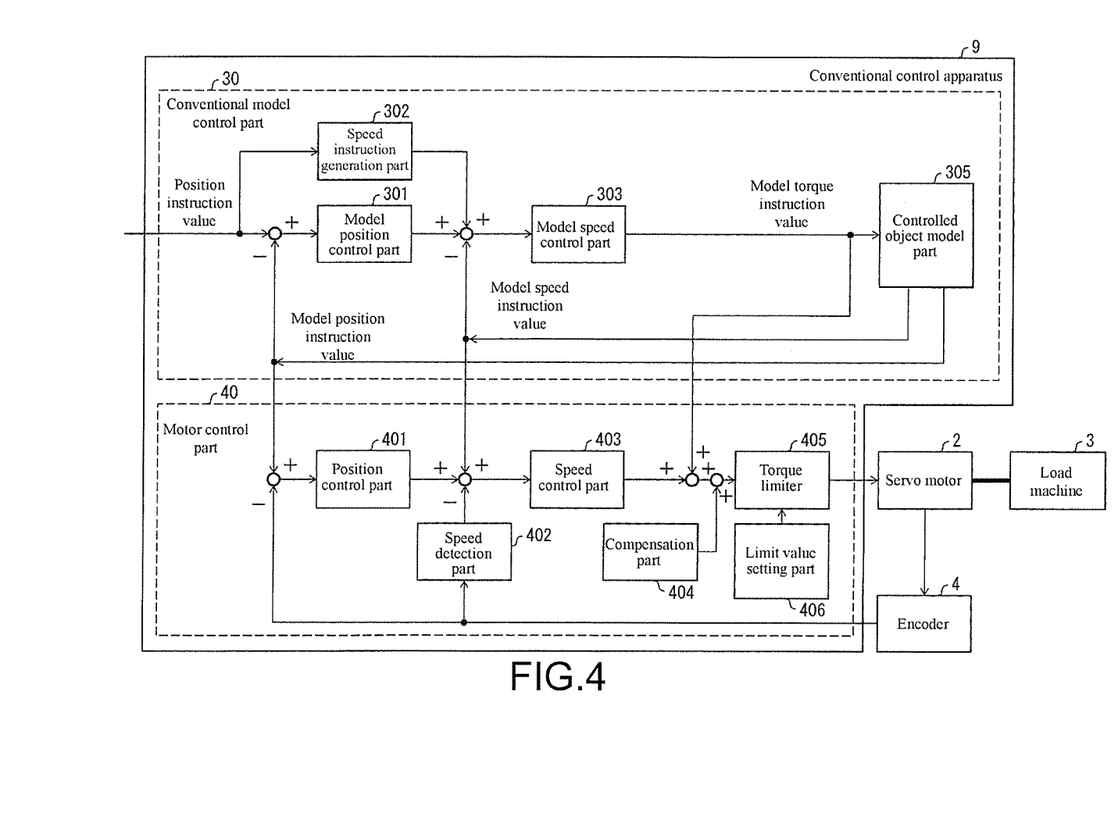
FIG. 4 is a diagram showing an overview of a conventional motor control apparatus.

FIG. 4 is a diagram showing an overview of the conventional control apparatus 9. As shown in FIG. 4, the conventional control apparatus 9 is a control apparatus that performs model-tracking control on a servo motor 2. FIG. 4 further shows: a load machine 3 driven by the servo motor 2; and an encoder 4, performing detection on a position of the servo motor 2, for example, performing detection on a rotational angle of the servo motor 2. The encoder 4 sends a detected position to a motor control part 40. Specifically, the position, detected by the encoder 4, of the servo motor 2 is input to a position control part 401 and a speed detection part 402 of the motor control part 40. In addition, the encoder 4 may also perform detection on a speed of the servo motor 2, and send a detected speed to the motor control part 40. In this case, the motor control part 40 may also not have the speed detection part 402. The speed detection part 402 calculates the speed of the servo motor 2 according to the position, detected by the encoder 4, of the servo motor 2.

The conventional control apparatus 9 has a conventional model control part 30 and the motor control part 40. The conventional model control part 30 outputs target values of the position, speed, and torque of the servo motor 2, that is, a model position instruction value $\theta_M$, a model speed instruction value $v_M$, and a model torque instruction value. That is, instruction values based on a model (standard model) of the servo motor 2 are output. Here, the conventional model control part 30 performs proportional integral derivative (PID) control on the model of the servo motor 2. That is, the conventional model control part 30 performs PID control on a target position, that is, the model position instruction value $\theta_M$ of the model and a target speed, that is, the model speed instruction value $v_M$ of the model by using a manner of tracking a position instruction value $\theta_R$ that is provided from outside (for example, from a user) and a speed instruction value $v_R$ generated by using the position instruction value $\theta_R$. The conventional model control part 30 has a model position control part 301, a speed instruction generation part 302, a model speed control part 303, and a controlled object model part 305.

The model position control part 301 receives the position instruction value $\theta_R$ and the model position instruction value $\theta_M$ that is generated by the controlled object model part 305, and generates a model speed control instruction that performs control in a manner of tracking the position instruction value $\theta_R$ by using the model position instruction value $\theta_M$. The model position control part 301 outputs the generated model speed control instruction to the model speed control part 303 and the motor control part 40.

The speed instruction generation part 302 receives the position instruction value $\theta_R$, and generates the speed instruction value $v_R$ by using the position instruction value $\theta_R$. The speed instruction generation part 302 outputs the generated speed instruction value $v_R$ to the model speed control part 303.

The model speed control part 303 receives the model speed control instruction generated by the model position control part 301, the speed instruction value $v_R$ generated by the speed instruction generation part 302, and the model speed instruction value $v_M$ generated by the controlled object model part 305. The model speed control part 303 generates the model torque instruction value in the following manner, that is, performs control in a manner of tracking the model speed control instruction and the speed instruction value $v_R$ by using the model speed instruction value $v_M$. In this case, the model speed control part 303 generates the model torque instruction value without considering a friction torque or a partial load, an external interference torque, and the like. The model speed control part 303 notifies the controlled object model part 305 and the motor control part 40 of the generated model torque instruction value. Here, the model torque instruction value is a target value of the torque of the servo motor 2, and is the torque of the model (standard model) of the servo motor 2.

The controlled object model part 305 receives the model torque instruction value generated by the model speed control part 303, generates the model position instruction value $\theta_M$ and the model speed instruction value $v_M$, and outputs the generated model position instruction value $\theta_M$ and the model speed instruction value $v_M$. That is, the model position instruction value $\theta_M$ that is generated by the controlled object model part 305 is notified to the model position control part 301 and the motor control part 40. The model speed instruction value $v_M$ generated by the controlled object model part 305 is notified to the model speed control part 303 and the motor control part 40.

The motor control part 40 performs PID control on the position, speed, and torque of the servo motor 2 in a manner of tracking the model position instruction value $\theta_M$, the model speed instruction value $v_M$, and the model torque instruction value that are controlled by the conventional model control part 30. The motor control part 40 has the position control part 401, the speed detection part 402, a speed control part 403, a compensation part 404, a torque limiter 405, and a limit value setting part 406.

The position control part 401 receives the position, detected by the encoder 4, of the servo motor 2 and the model position instruction value $\theta_M$ that is generated by the controlled object model part 305, and generates a speed control instruction that is controlled in a manner of tracking the model position instruction value $\theta_M$ by using the detected position of the servo motor 2. Moreover, the position control part 401 outputs the generated speed control instruction to the speed control part 403.

The speed detection part 402 calculates the speed of the servo motor 2 according to the position, detected by the encoder 4, of the servo motor 2, and outputs the calculated speed of the servo motor 2 to the speed control part 403.

The speed control part 403 receives the speed control instruction that is generated by the position control part 401, the model detection speed that is generated by the controlled object model part 305, and the speed (the speed of the servo motor 2) that is calculated by the speed detection part 402. Moreover, the torque control instruction that is controlled in a manner of tracking the speed control instruction and the model detection speed by using the speed, calculated by the speed detection part 402, of the servo motor 2 is generated, and outputs the generated torque control instruction to the torque limiter 405. In this case, the speed control part 403 generates the torque control instruction without considering the friction torque or partial load, the external interference torque, and the like.

The compensation part 404 considers a kinetic friction torque $F_d$, a viscosity friction torque $F_v$, and a partial load torque $\tau_u$ that are generated in the servo motor 2, an external interference torque $\tau_{obs}$ that is generated because of an external interference factor, and the like, and generates a torque correction value C that is obtained by combining these torques.

The kinetic friction torque $F_d$ is a constant whose symbol changes according to the speed v of the servo motor 2. The compensation part 404 prestores an absolute value of $F_d$, and determines a symbol according to the model speed instruction value $v_M$ output from the controlled object model part 305, so as to set the kinetic friction torque $F_d$. Alternatively, the compensation part 404 may also determine the symbol according to the actual speed (the output value of the speed detection part 402, or, speed information from the encoder 4 in a case in which the encoder 4 may output speed information) of the servo motor 2, so as to set the kinetic friction torque $F_d$.

The viscosity friction torque $F_v$ is represented by using a function $F_v(v)$ that changes according to the speed v of the servo motor 2. The compensation part 404 prestores the function, and the viscosity friction torque $F_v$ is calculated according to the model speed instruction value $v_M$ output from the controlled object model part 305. Alternatively, the compensation part 404 may also calculate the viscosity friction torque $F_v$ according to the actual speed (the output value of the speed detection part 402, or speed information from the encoder 4 in a case in which the encoder 4 may output speed information) of the servo motor 2.

In addition, the actual speed of the servo motor 2 is sometimes susceptible to unexpected external interference and the like. In this case, if the actual speed of the servo motor 2 is used to calculate the kinetic friction torque $F_d$ or the viscosity friction torque $F_v$, the torque output by the model may become unstable. Therefore, in a case of an environment of high susceptibility to unexpected external interference and the like, preferably, the compensation part 404 calculates the kinetic friction torque $F_d$ or the viscosity friction torque $F_v$ according to the model speed instruction value $v_M$ that is used as a driving state of the servo motor 2 and is output from the controlled object model part 305.

The partial load torque t represents a torque generated from a load that is generated in only a specific direction relative to the load machine 3, for example, a torque generated under the influence of gravity when the load machine 3 moves reciprocally in a vertical direction. Moreover, the external interference torque $\tau_{obs}$ is a torque generated because of external interference imposed on the servo motor 2 or the load machine 3.

The compensation part 404 calculates, as shown in the following formula, a sum of the kinetic friction torque $F_d$, the viscosity friction torque $F_v$, the partial load torque $\tau_u$, and the external interference torque $\tau_{obs}$ that are determined, so as to generate the torque correction value C.

$$C = F_d + F_v + \tau_u + \tau_{obs}$$

The torque limiter 405 receives a sum value of a torque control instruction generated by a speed control part 203, the torque correction value C generated by the compensation part 404, and the model torque instruction value generated by the controlled object model part 305, uses the sum value as a driving torque instruction value, determines whether the input driving torque instruction value is within a limit range set by a limit value setting part 406, and controls the servo motor 2 based on a determining result.

Specifically, in a case in which a sum value of the torque control instruction, the torque correction value C, and the model torque instruction value, that is, the driving torque instruction value is within the limit range, a torque limiter 204 controls the servo motor 2 based on the driving torque instruction value. In another aspect, in a case in which the driving torque instruction value is beyond the limit range, the torque limiter 204 limits the driving torque instruction value to be a value within the limit range and then controls the servo motor 2.

The limit value setting part 406 sets an upper limit value (a positive value) and a lower limit value (a negative value) of the limit range used in the torque limiter 204. In a case in which there is an input from a user, the limit value setting part 406 sets the upper limit value and the lower limit value according to the input. In a case in which there is no input from a user, when a maximum torque value (a positive value, whose absolute value reaches a maximum torque) of the servo motor 2 is $\tau_{max}$, a minimum torque value (a negative value, whose absolute value reaches a maximum torque) of the servo motor 2 is $-\tau_{max}$, the upper limit value is set to be $\tau_{max}$, and the lower limit value is set to be $-\tau_{max}$.

In the conventional control apparatus 9, a sum value of the torque control instruction generated by the speed control part 203, the torque correction value C generated by the compensation part 404, and the model torque instruction value output from the model control part 30, that is, the driving torque instruction value is used to control the servo motor 2. However, the model torque instruction value is not limited in the model control part 30. Therefore, even if the model torque instruction value output from the model control part 30 is below a maximum torque value of the servo motor 2, there is still a case in which the driving torque instruction value that is obtained by calculating a sum using the torque correction value C output from the compensation part 404 exceeds the maximum torque value. In this case, in the control of the servo motor 2 by the motor control part 40, the model tracking performance is reduced. Therefore, the following problem occurs: The control of the servo motor 2 by the motor control part 40 becomes unstable, or even, the behavior of the load machine 3 that is used as a controlled object becomes unstable.

Moreover, in the conventional control apparatus 9, the motor control part 40 has the torque limiter 405. In contrast, in the model control part 30, the model torque instruction value is not limited. Therefore, the model torque instruction value from the model control part 30 may greatly deviate from a limit range of the torque limiter 405 of the motor control part 40. In this case, in the control of the servo motor 2 by the motor control part 40, the model tracking performance is reduced. Therefore, the following problem occurs: The control of the servo motor 2 by the motor control part 40 becomes unstable, or even, the behavior of the load machine 3 that is used as a controlled object becomes unstable.

Such a problem is resolved in an implementation manner of the present invention, and the implementation manner is described below in detail.

(Implementation Manner 1)

Figure 1:
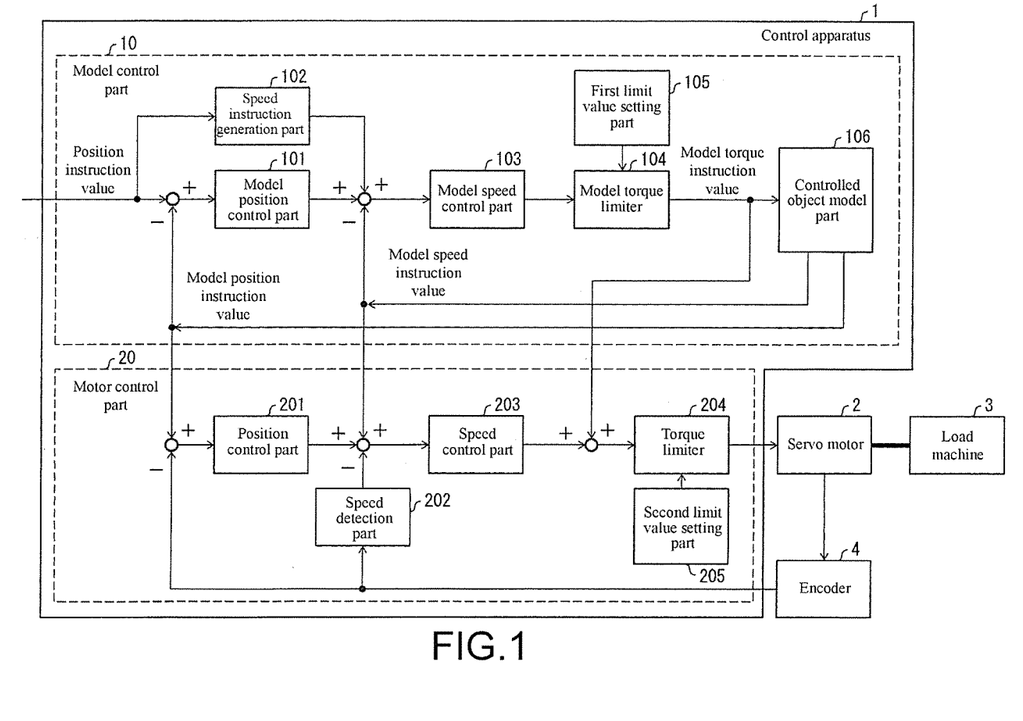
FIG. 1 is a structural block diagram showing main parts of a control apparatus according to Implementation Manner 1 of the present invention.

FIG. 1 is a structural block diagram showing main parts of a control apparatus (motor control apparatus) 1 according to Implementation Manner 1 of the present invention. The control apparatus 1 is a control apparatus that performs model-tracking control on a servo motor 2. That is, the control apparatus 1 includes: a model control part 10, outputting a model instruction value (a model position instruction value, a model speed instruction value, and a model torque instruction value) based on a model (standard model) including a controlled object of the servo motor 2; and a motor control part 20, controlling the servo motor 2 in a manner of tracking the model instruction value output by the model control part 10.

The motor control part 20 has a position control part 201, a speed detection part 202, a speed control part 203, a torque limiter (a second torque limiting part) 204, and a second limit value setting part 205. Here, the functions of the position control part 201, the speed detection part 202, the speed control part 203, and the torque limiter 204 are respectively the same as those of the position control part 401, the speed detection part 402, the speed control part 403, and the torque limiter 405 shown in FIG. 4. Therefore, detailed description is omitted.

Same as the case of the limit value setting part 406 shown in FIG. 4, the second limit value setting part 205 sets an upper limit value $\tau_{2\_u}$ (a positive maximum value) and a lower limit value $\tau_{2\_l}$ (a negative maximum value) of a second limit range used in the torque limiter 405. That is, in a case in which there is an input from a user, the second limit value setting part 205 sets the upper limit value $\tau_{2\_u}$ and the lower limit value $\tau_{2\_l}$ of the second limit range according to the input. In a case in which there is no input from a user, when a maximum torque value of the servo motor 2 is set to be $\tau_{max}$, and a minimum torque value of the servo motor 2 is set to be $-\tau_{max}$, the upper limit value $\tau_{2\_u}$ is set to be $\tau_{max}$, and the lower limit value $\tau_{2\_l}$ is set to be $-\tau_{max}$. In addition, in a case in which a user inputs an upper limit value that exceeds $\tau_{max}$, the second limit value setting part 205 may also set $\tau_{max}$ as the upper limit value $\tau_{2\_u}$, and may further notify an error to prompt the user to input again a value below $\tau_{max}$, and set the value input again to be the upper limit value $\tau_{2\_u}$. Similarly, in a case in which a user inputs a lower limit value lower than $-\tau_{max}$, the second limit value setting part 205 may also set $-\tau_{max}$ to be the lower limit value $\tau_{2\_l}$, and may further notify an error to prompt the user to input again a value above $-\tau_{max}$, and set the value input again to be the lower limit value $\tau_{2\_l}$.

Figure 2:
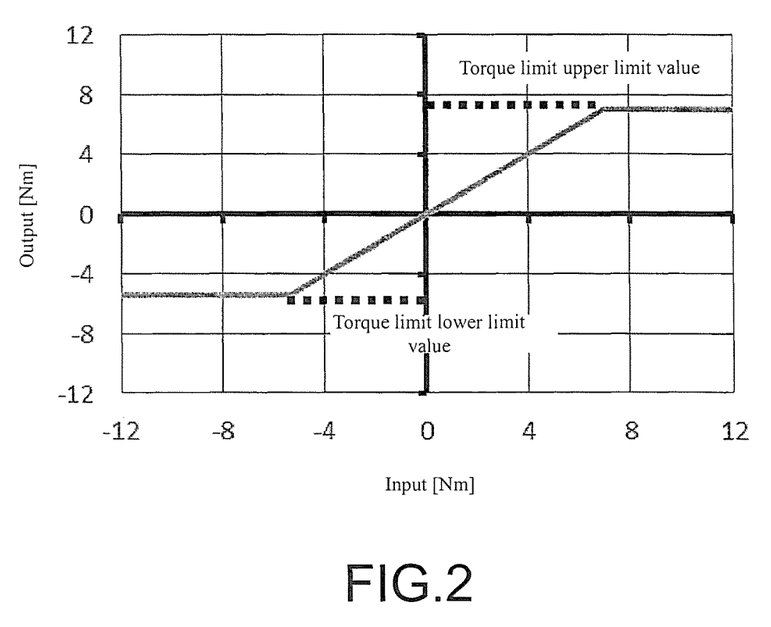
FIG. 2 is a diagram of describing functions of a torque limiter.

FIG. 2 is a diagram showing a relationship between an input and an output in the torque limiter 204 according to the upper limit value $\tau_{2\_u}$ and the lower limit value $\tau_{2\_l}$ that are set by the second limit value setting part 205. As shown in FIG. 2, in a case in which a driving torque instruction value input for the torque limiter 204 is below the upper limit value $\tau_{2\_u}$ and is above the lower limit value $\tau_{2\_l}$ (that is, in a case in which the driving torque instruction value is within the second limit range), the torque limiter 204 controls the servo motor 2 according to the input driving torque instruction value. In another aspect, in a case in which the input driving torque instruction value exceeds the upper limit value $\tau_{2\_u}$, the torque limiter 204 controls the servo motor 2 according to the torque of the upper limit value $\tau_{2\_u}$, and in a case in which the input driving torque instruction value is lower than the lower limit value $\tau_{2\_l}$, the torque limiter 204 controls the servo motor 2 according to the torque of the lower limit value $\tau_{2\_l}$.

The model control part 10 has a model position control part 101, a speed instruction generation part 102, a model speed control part 103, a model torque limiter (a first torque limiting part) 104, a first limit value setting part (setting part) 105, and a controlled object model part 106. Here, the functions of the model position control part 101, the speed instruction generation part 102, the model speed control part 103, and the controlled object model part 106 are respectively the same as those of the model position control part 301, the speed instruction generation part 302, the model speed control part 303, and the controlled object model part 305 shown in FIG. 4. Therefore, detailed description is omitted.

The model torque limiter 104 determines whether the model torque instruction value controlled by the model speed control part 103 is within a first limit range set by the first limit value setting part 105, imposes a limit according to a need, and then outputs the model torque instruction value.

Specifically, in a case in which the model torque instruction value input from the model speed control part 103 is within the limit range, the model torque limiter 104 directly outputs the model torque instruction value. In another aspect, in a case in which the model torque instruction value input from the model speed control part 103 is beyond the limit range, the model torque limiter 104 limits the model torque instruction value to be a value within the limit range and output the value.

The first limit value setting part 105 sets limit values, that is, an upper limit value $\tau_{1\_u}$, and a lower limit value $\tau_{1\_l}$, of the first limit range used in the model torque limiter 104. The first limit value setting part 105 sets the upper limit value $\tau_{1\_u}$ and the lower limit value $\tau_{1\_l}$ of the first limit range to be the same as the upper limit value $\tau_{2\_u}$ and the lower limit value $\tau_{2\_l}$ of the second limit range that are set by the second limit value setting part 205.

A relationship between an input and an output in the model torque limiter 104 according to the upper limit value $\tau_{1\_u}$ and the lower limit value $\tau_{1\_l}$ that are set by the first limit value setting part 105 is similar to that in FIG. 2. That is, in a case in which the model torque instruction value input for the model torque limiter 104 is below the upper limit value $\tau_{1\_u}$ and is above the lower limit value $\tau_{1\_l}$ (that is, in a case in which the model torque instruction value is within the first limit range), the model torque limiter 104 directly outputs the input model torque instruction value. In another aspect, in a case in which the input model torque instruction value exceeds the upper limit value $\tau_{1\_u}$, the model torque limiter 104 outputs the upper limit value $\tau_{1\_u}$, as the model torque instruction value, and in a case in which the input model torque instruction value is lower than the lower limit value $\tau_{1\_l}$, the model torque limiter 104 outputs the lower limit value $\tau_{1\_l}$ as the model torque instruction value.

As discussed above, the control apparatus 1 in this implementation manner includes: the motor control part 20, generating, based on a detection value of an encoder 4 (a rotation detector) that performs detection on a rotational state of the servo motor 2, a driving torque instruction value used to enable the servo motor 2 to perform driving; and the model control part 10, generating the model torque instruction value, and outputting the model torque instruction value to the motor control part 20, where the model control part 10 has the model torque limiter (the first torque limiting part) 104 that limits the model torque instruction value within the first limit range.

Therefore, the model torque instruction value can be limited, so that the driving torque instruction value generated by the motor control part 20 is stabilized. As a result, the behavior of a controlled object can be stabilized.

Moreover, in this implementation manner, the first limit value setting part 105 of the model control part 10 set the upper limit value $\tau_{1\_u}$ and the lower limit value $\tau_{1\_1}$ of the model torque limiter 104 to be the same as the upper limit value $\tau_{2\_u}$ and the lower limit value $\tau_{2\_1}$ that are set by the second limit value setting part 205 of the motor control part 20.

Therefore, the model torque instruction value output from the model control part 10 is within the second limit range of the torque limiter 204 in the motor control part 20, so that the model tracking performance of control by the motor control part 20 can be further improved.

(Implementation Manner 2)

Figure 3:
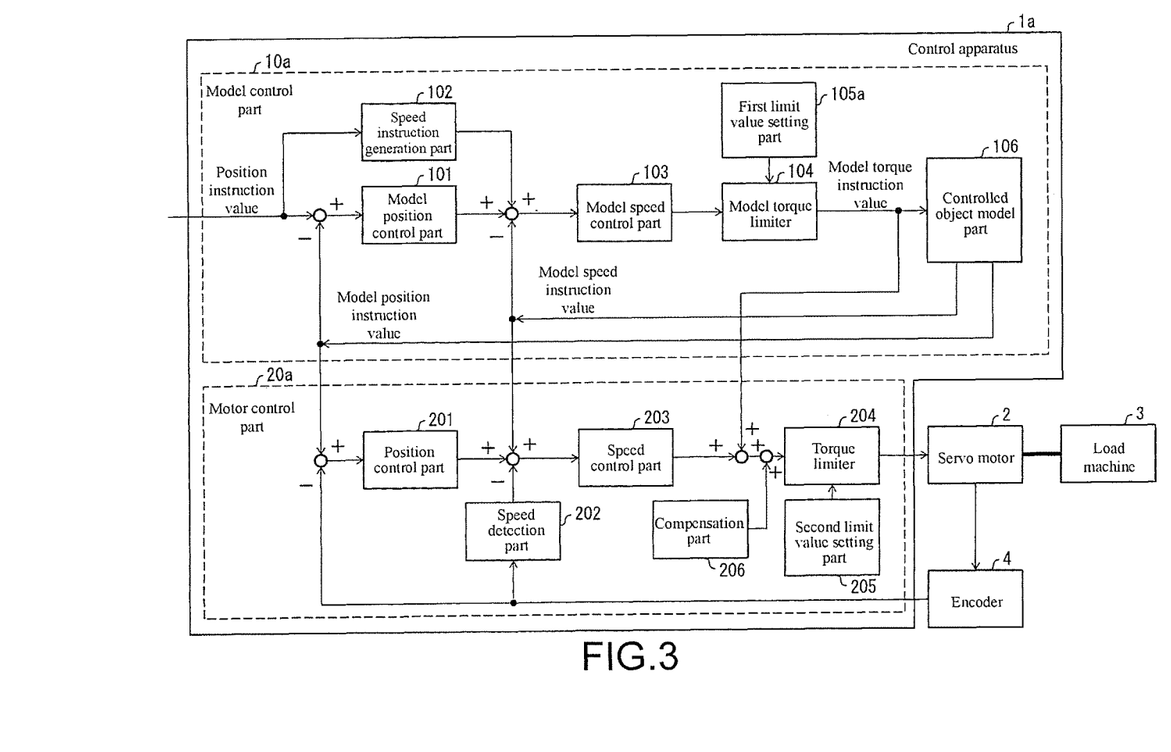
FIG. 3 is a structural block diagram showing main parts of control apparatuses according to Implementation Manner 2 and Implementation Manner 3 of the present invention.

FIG. 3 is a structural block diagram showing main parts of a control apparatus (a motor control apparatus) 1a according to Implementation Manner 2 of the present invention. As shown in FIG. 3, the control apparatus 1a in this implementation manner includes: a model control part 10a, controlling a model (standard model) of a servo motor 2; and a motor control part 20a, controlling the servo motor 2 in a manner of tracking the model of the servo motor 2 controlled by the model control part 10a.

A difference of the motor control part 20a from the motor control part 20 in Implementation Manner 1 is only that the motor control part 20a has a compensation part 206. Therefore, the description of blocks other than the compensation part 206 is omitted.

The compensation part 206 has a function similar to that of the compensation part 404 shown in FIG. 4. That is, the compensation part 206 calculates a sum of a kinetic friction torque $F_d$, a viscosity friction torque $F_v$, and a partial load torque $\tau_u$ that are generated in the servo motor 2 and an external interference torque $\tau_{obs}$ that is generated because of an external interference factor, so as to generate a torque correction value C according to $$C = F_d + F_v(v) + \tau_u + \tau_{obs}.$$

Here, the kinetic friction torque $F_d$ and the viscosity friction torque $F_v$ are elements (first compensation elements) that change according to a driving state of the servo motor 2, and the partial load torque $\tau_u$ and the external interference torque $\tau_{obs}$ are elements (second compensation elements) that change according to a driving characteristic of a load machine 3 that is used as a controlled object.

In addition, similar to the compensation part 404, the compensation part 206 prestores an absolute value of $F_d$, and determines a symbol according to a model speed instruction value output from a controlled object model part 106, so as to set the kinetic friction torque $F_d$. Alternatively, the compensation part 206 may also determine a symbol according to the actual speed (an output value of the speed detection part 402, or speed information from the encoder 4 in a case in which an encoder 4 may output speed information) of the servo motor 2, so as to set the kinetic friction torque $F_d$.

Moreover, the compensation part 206 prestores a function $F_v(v)$ of a viscosity friction torque that changes according to the speed v of the servo motor 2, and calculates the viscosity friction torque $F_v$ according to a model speed instruction value output from the controlled object model part 106. Alternatively, the compensation part 206 may also calculate the viscosity friction torque $F_v$ according to the actual speed (the output value of the speed detection part 402, or the speed information from the encoder 4 in a case in which the encoder 4 may output speed information) of the servo motor 2.

The compensation part 206 may set a preset value to be the partial load torque $\tau_u$ and/or the external interference torque $\tau_{obs}$, or may also calculate the partial load torque $\tau_u$ and/or the external interference torque $\tau_{obs}$ according to a preset function.

In addition, the compensation part 206 does not need to use all of the kinetic friction torque $F_d$, the viscosity friction torque $F_v$, the partial load torque $\tau_u$, and the external interference torque $\tau_{obs}$ and may also consider some of the torques to determine the torque correction value C, or may further add, to the torque correction value C, a torque generated because of another factor.

Moreover, in this implementation manner, a sum value of the torque control instruction generated by the speed control part 203, a model torque instruction value output from the model control part 10a, and the torque correction value C generated by the compensation part 206 is used as a driving torque instruction value and is input to the torque limiter 204.

A difference of the model control part 10a from the model control part 10 in Implementation Manner 1 lies in only that the first limit value setting part (setting part) 105a is used in place of the first limit value setting part 105. Therefore, the description of blocks other than the first limit value setting part 105a is omitted.

The first limit value setting part 105a sets limit values, that is, an upper limit value $\tau_{1\_u}$, and a lower limit value $\tau_{1\_1}$ of a first limit range that is used in a model torque limiter 104. The first limit value setting part 105a sets a value that is obtained by subtracting the torque correction value C from the upper limit value $\tau_{2\_u}$ of a second limit range set by the second limit value setting part 205 to be the upper limit value $\tau_{1\_u}$, and sets a value that is obtained by subtracting the torque correction value C from the lower limit value $\tau_{2\_1}$ of the second limit range as the lower limit value $\tau_{1\_1}$.

In addition, the first limit value setting part 105a may also generate the torque correction value C by using operation processing similar to that of the compensation part 206, and use the generated torque correction value C to set the upper limit value $\tau_{1\_u}$ and the lower limit value $\tau_{1\_1}$, or may further use the torque correction value C generated by the compensation part 206 to set the upper limit value $\tau_{1\_u}$ and the lower limit value $\tau_{1\_1}$.

In the motor control part 20a, the torque limiter 204 imposes limit on the sum value of the torque control instruction generated by the speed control part 203, the model torque instruction value output from the model control part 10a, and the torque correction value C generated by the compensation part 206. Therefore, even if the model torque instruction value output from the model control part 10a is within the second limit range of the torque limiter 204, there is still a case in which because the torque correction value C is added, the sum value is beyond the second limit range of the torque limiter 204. In this case, the model tracking performance of control of the servo motor 2 by the motor control part 20a may be reduced.

However, in this implementation manner, as discussed above, as the upper limit value $\tau_{1\_u}$ of the first limit range of the model torque limiter 104 of the model control part 10a, a value that is obtained by subtracting the torque correction value C from the upper limit value $\tau_{2\_u}$ of the second limit range of the torque limiter 204 is set. As the lower limit value $\tau_{1\_1}$ of the first limit range, a value that is obtained by subtracting the torque correction value C from the lower limit value $\tau_{2\_1}$ of the second limit range is set.

For example, in a case in which a maximum torque value and a minimum torque value of the servo motor 2 are set as the upper limit value and the lower limit value of the second limit range, the first limit value setting part 105a sets a value that is obtained by subtracting the torque correction value C from the maximum torque value to be the upper limit value $\tau_{1\_u}$, and sets a value that is obtained by subtracting the torque correction value C from the minimum torque value to be the lower limit value $\tau_{1\_1}$.

Alternatively, in a case in which values designated by a user are used as the upper limit value and the lower limit value of the second limit range, the first limit value setting part 105a set the upper limit value $\tau_{1\_u}$ and the lower limit value $\tau_{1\_1}$ by using values that are obtained by subtracting the torque correction value C from the values designated by the user.

Therefore, in the motor control part 20a, the frequency that the sum value of the torque control instruction generated by the speed control part 203, the model torque instruction value output from the model control part 10a, and the torque correction value C generated by the compensation part 206, that is, the driving torque instruction value, exceeds the second limit range of the torque limiter 204 can be reduced, so that the model tracking performance in the control apparatus 1a can be improved. As a result, the behavior of the load machine 3 that is used as the controlled object can be further stabilized, so that the load machine 3 can be enabled to perform operation according to needed operation.

(Implementation Manner 3)

In the Implementation Manner 2, the upper limit value $\tau_{1\_u}$ of the first limit range of the model torque limiter 104 that is used as the model control part 10a is set to be a value that is obtained by subtracting the torque correction value C from the upper limit value $\tau_{2\_u}$ of the second limit range of the torque limiter 204. As the lower limit value $\tau_{1\_1}$ of the first limit range, a value that is obtained by subtracting the torque correction value C from the lower limit value $\tau_{2\_1}$ of the second limit range is set. Therefore, in a case in which the torque correction value C is a large value or in a case in which small values are set as absolute values of the upper limit value $\tau_{2\_u}$ and the lower limit value $\tau_{2\_1}$, the following case may occur, that is, as the upper limit value $\tau_{1\_u}$, 0 or a negative value is set, and as the lower limit value $\tau_{1\_1}$, 0 or positive value is set.

In this case, although a user inputs a position instruction value in the control apparatus 1a, but the model torque instruction value is 0, and a servo motor 2 does not perform operation. Generally, the user does not specifically understand internal processing of the control apparatus 1a, and therefore it is difficult for the user to determine the reason why the servo motor 2 does not perform operation. Therefore, such a state is not desirable.

Therefore, in the control apparatus 1a in Implementation Manner 3 of the present invention, although a structure similar to that in Implementation Manner 2 is provided (referring to FIG. 3), the first limit value setting part 105a sets the upper limit value $\tau_{1\_u}$ and the lower limit value $\tau_{1\_1}$ of the first limit range of the model torque limiter 104 according to the following mathematical expressions.

$$\tau_{1\_u} = \begin{cases} \tau_{2\_u} - C, & \tau_{2\_u} - C \geq \tau_0 \\ \tau_0, & \tau_{2\_u} - C < \tau_0 \end{cases} \quad \text{[Expression 1]}$$

-continued $$\tau_{1\_l} = \begin{cases} \tau_{2\_l} - C, & \tau_{2\_l} - C \leq -\tau_0 \\ -\tau_0, & \tau_{2\_l} - C > -\tau_0 \end{cases}$$

In the mathematical expression, $\tau 0$ is a positive value, and is preset. According to the mathematical expression, in a case in which a value that is obtained by subtracting the torque correction value C from the upper limit value $\tau_{2\_u}$ of the second limit range is above $\tau 0$, the first limit value setting part 105a sets the subtraction value to be the upper limit value $\tau_{1\_u}$ of the first limit range, and in a case in which the subtraction value is less than $\tau 0$, sets $\tau 0$ to be the upper limit value $\tau_{1\_u}$ of the first limit range. Therefore, as the upper limit value $\tau_{1\_u}$ of the first limit range, 0 or a negative value is not set.

Similarly, in a case in which the value that is obtained by subtracting the torque correction value C from the lower limit value $\tau_{2\_1}$ of the second limit range is below $-\tau 0$, the first limit value setting part 105a sets the subtraction value to be the lower limit value $\tau_{1\_1}$ of the first limit range, and in a case in which the subtraction value is greater than $-\tau 0$, sets $-\tau 0$ to be the lower limit value $\tau_{1\_1}$ of the first limit range. Therefore, as the lower limit value $\tau_{1\_1}$ of the first limit range, 0 or a positive value is not set.

According to this implementation manner, the following case, that is, although the user inputs a position instruction value in the control apparatus 1a, the model torque instruction value is 0, and the servo motor 2 does not perform operation, can be avoided.

In addition, in the description, the upper limit value $\tau_{1\_u}$ is limited to be above $\tau 0$ that is used as a first specified value, and the lower limit value $\tau_{1\_1}$ is limited to be below $-\tau 0$ that is used as a second specified value. However, absolute values of the first specified value and the second specified value may also be different. The first specified value only needs to be greater than 0, and the second specified value only needs to be less than 0.

Moreover, in the description, $\tau 0$ that is used as the first specified value and $-\tau 0$ that is used as the second specified value are preset, but the first limit value setting part 105a may also set the first specified value and the second specified value according to an input of a user. Therefore, the user can set a minimum range of the first limit range of the model torque instruction value to be a needed range. In this case, the user can set the first specified value and the second specified value by, for example, inputting a needed value in an external apparatus that can be connected to the control apparatus 1a. As an external apparatus, a general-purpose personal computer or a programmable display in which a setting function (software) of the first specified value and the second specified value is installed may be used.

Embodiment Using Software

Control blocks (in particular the model control part 10, the model control part 10a, the model torque limiter 104, the first limit value setting part 105, the first limit value setting part 105a, the motor control part 20, the motor control part 20a, the torque limiter 204, the second limit value setting part 205, and the compensation part 206) of the control apparatus 1 and the control apparatus 1a may be implemented by using a logic circuit (hardware) formed on an integrated circuit (IC chip), or may be implemented by using a central processing unit (CPU) by means of software.

In the case of the latter, the control apparatus 1 and the control apparatus 1a have a CPU that executes a command of software, that is, a program for implementing various functions, a read-only memory (ROM) or a storage apparatus (or referred to as a "recording medium") that is readable by a computer (or a CPU) and records the program and various data, a random access memory (RAM) that expands the program, and the like. Moreover, the computer (or the CPU) is used to read the program from the recording medium and execute the program, so as to achieve an objective of the present invention. As the recording medium, a "non-temporary tangible medium" such as a tape, a disk, a card, a semiconductor memory, and a programmable logic circuit may be used. Moreover, the program may also be provided to the computer via any transmission medium (a communication network or a radio wave) that can be used to transmit the program. In addition, the present invention may also be implemented by using a form of a data signal that embodies the program by means of electronic transmission and is inserted in a carrier.

The present invention is not limited to the implementation manners, and various variations may be made within the scope shown in the claims. An implementation manner that is obtained by combining in a suitable manner technical parts respectively disclosed in different implementation manners also falls within the technical scope of the present invention.

In addition, in Implementation Manner 1 to Implementation Manner 3, it is disclosed that a structure of the model control part 10 has the model position control part 101, the speed control part 103, the model torque limiter 104, a controlled object model part 106, but the structure of the model control part 10 is not limited thereto. For example, the structure may also be that the model position control part 101, the speed control part 103, the model torque limiter 104, and the controlled object model part 106 are integrated into one model controller. That is, as what is recorded in the claims, the model torque limiter 104 only needs to have a limit function of limiting a model torque instruction value in the model control part 10.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A motor control apparatus, performing control on a motor comprised in a controlled object, wherein the motor control apparatus comprises:
   a motor control part, generating a driving torque instruction value used to enable the motor to perform driving based on a detection value of a rotation detector that performs detection on a rotational state of the motor; and
   a model control part, generating a model instruction value based on a model of the controlled object of the motor, and outputting the model instruction value to the motor control part, wherein
   the model control part comprises a first torque limiting part, wherein the first torque limiting part limits a model torque instruction value comprised in the model instruction value within a first limit range.

2. The motor control apparatus according to claim 1, wherein
   the model control part comprises a setting part, wherein the setting part sets an upper limit value and a lower limit value of the first limit range, and the setting part sets the upper limit value and the lower limit value of the first limit range by using a manner in which an absolute value is a value greater than 0.

3. The motor control apparatus according to claim 1, wherein
   the motor control part comprises a second torque limiting part, wherein the second torque limiting part limits the driving torque instruction value within a second limit range, and
   the model control part comprises a setting part, wherein the setting part sets an upper limit value of the second limit range to be the upper limit value of the first limit range, and sets a lower limit value of the second limit range to be the lower limit value of the first limit range.

4. The motor control apparatus according to claim 1, wherein
   the motor control part comprises a compensation part, wherein the compensation part adds a torque correction value to the driving torque instruction value, and the torque correction value is at least one of a first compensation element that changes according to a driving state of the motor and a second compensation element that changes according to a driving characteristic of the controlled object, and
   the model control part comprises a setting part, wherein the setting part subtracts the torque correction value from a maximum torque value and a minimum torque value of the motor, so as to set the upper limit value and the lower limit value of the first limit range.

5. The motor control apparatus according to claim 1, wherein
   the motor control part comprises:
   a compensation part, adding a torque correction value to the driving torque instruction value, wherein the torque correction value is at least one of a first compensation element that changes according to a driving state of the motor and a second compensation element that changes according to a driving characteristic of the controlled object; and
   a second torque limiting part, limiting the driving torque instruction value within a second limit range, and
   the model control part comprises a setting part, wherein the setting part sets a value that is obtained by subtracting the torque correction value from an upper limit value of the second limit range to be the upper limit value of the first limit range, and sets a value that is obtained by subtracting the torque correction value from a lower limit value of the second limit range to be the lower limit value of the first limit range.

6. The motor control apparatus according to claim 5, wherein
   the setting part sets, in a case in which a first subtraction value that is obtained by subtracting the torque correction value from the upper limit value of the second limit range is above a first specified value greater than 0, the first subtraction value to be the upper limit value of the first limit range, sets, in a case in which the first subtraction value is less than the first specified value, the first specified value to be the upper limit value of the first limit range, sets, in a case in which a second subtraction value that is obtained by subtracting the torque correction value from the lower limit value of the second limit range is below a second specified value less than 0, the second subtraction value to be the lower limit value of the first limit range, and sets, in a case in which the second subtraction value is greater than the second specified value, the second specified value to be the lower limit value of the first limit range.

7. The motor control apparatus according to claim 6, wherein the setting part determines the first specified value and the second specified value according to an input of a user.

8. A motor control method, performing control on a motor comprised in a controlled object, wherein the motor control method comprises:

a model procedure: generating a model instruction value based on a model of the controlled object of the motor; and a motor procedure: generating a driving torque instruction value used to enable the motor to perform driving based on the model instruction value and a detection value of a rotation detector that performs detection on a rotational state of the motor, wherein in the model procedure, a model torque instruction value comprised in the model instruction value is limited within a first limit range.

9. An information processing program stored on a non-transitory computer-readable medium, wherein when a computer loads and executes the information processing program, the information processing program executes the motor control method according to claim 8.

10. A non-transitory computer-readable medium, wherein the information processing program according to claim 9 is recorded in the non-transitory computer-readable medium and is readable by a computer.

* * * * *